INVENTOR.
Gerald L. J. Mitchell
BY
Donald W. Spurrell
ATTORNEY

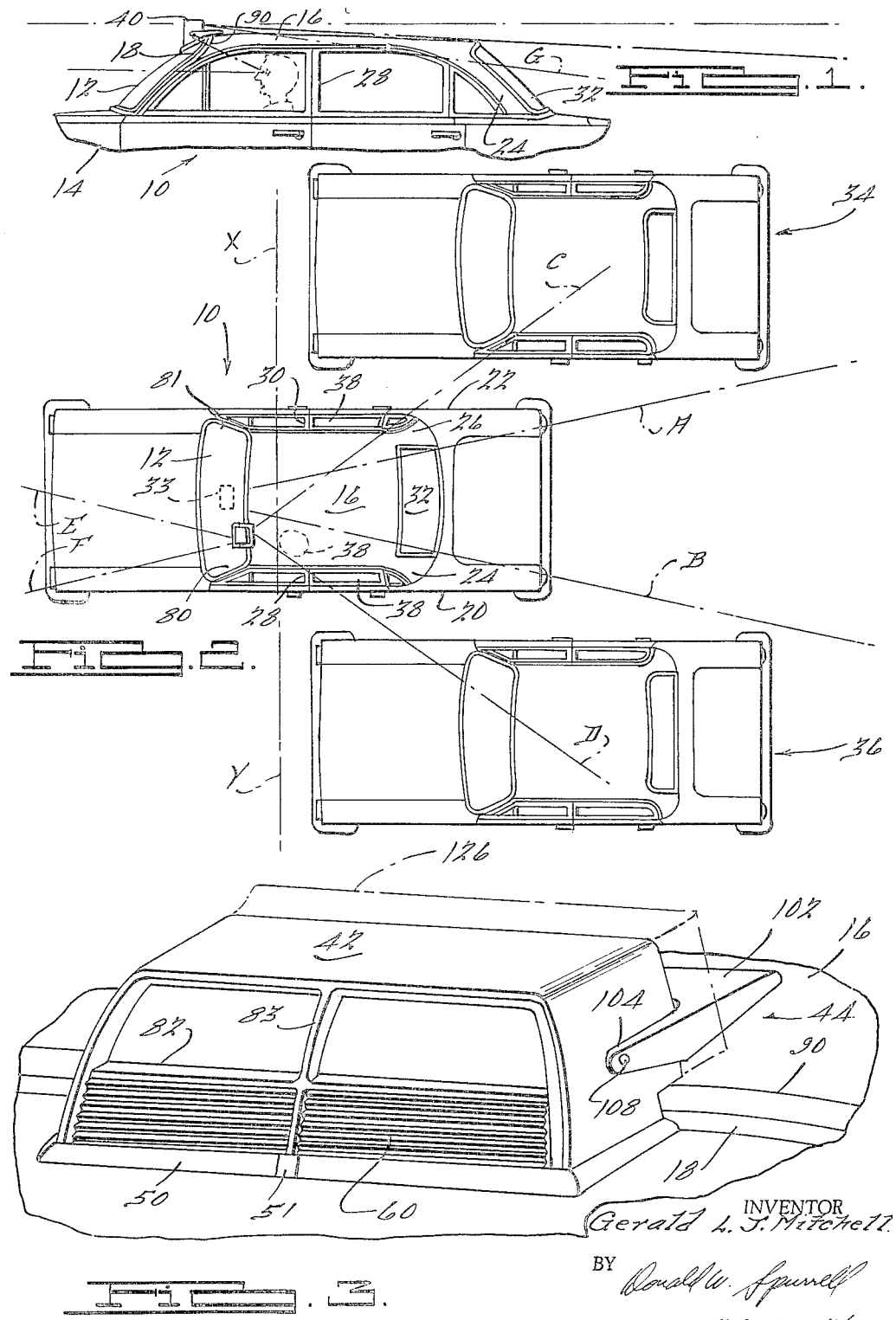

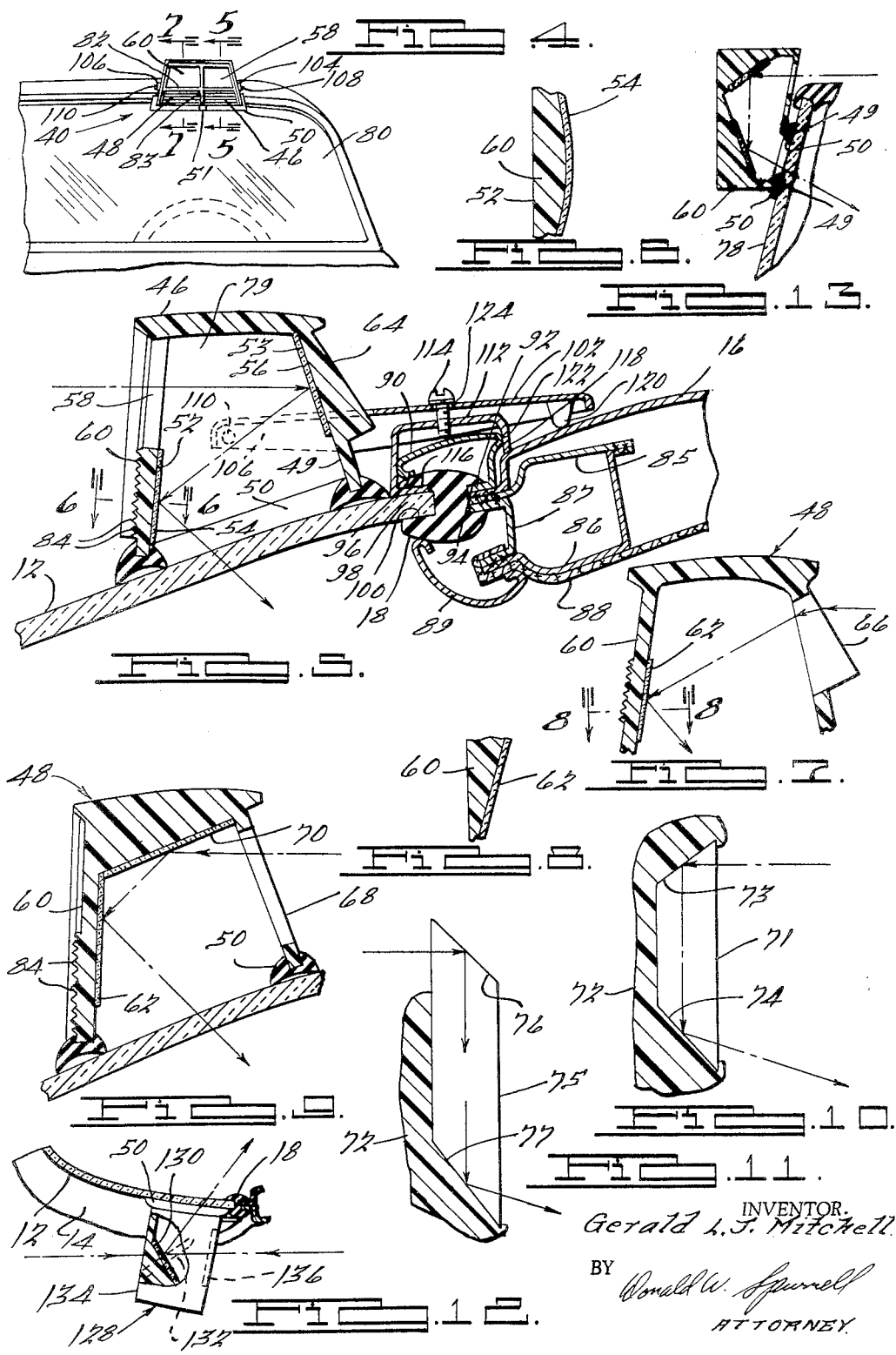

INVENTOR.
Gerald L. J. Mitchell
BY Donald W. Spurrell
ATTORNEY

United States Patent Office 3,229,580
Patented Jan. 18, 1966

3,229,580
EXTERIOR VIEWER FOR AUTOMOTIVE
VEHICLES
Gerald L. J. Mitchell, 640 Carla Way, La Jolla, Calif.
Filed Feb. 10, 1964, Ser. No. 343,898
4 Claims. (Cl. 88—86)

This invention relates to an improved viewer for vehicles which functions to assist the operators thereof in observing nearby or approaching vehicles.

This application is a continuation-in-part of applicant's copending application Serial No. 173,744, filed February 16, 1962, now abandoned.

As is well known to the operators of automotive vehicles, the construction thereof often renders it difficult for an operator to observe his position relative to other vehicles and particularly those at the rear of the sides of his vehicle. For example, in many automobiles the operator's view through the rear mirror toward the right and left rear quarters thereof is blocked by the rear roof supports and adjacent structure of the vehicle. In certain vehicles these roof supports are so large that a proper view toward the rear quarters is not possible even if the operator sights directly by turning his head around. In other vehicles equally dangerous "blind spots" are created by the limited size and viewing angle of the rear view mirror itself.

Another structural feature of automotive vehicles which impairs side and rearward vision are the side pillars or roof supports and particularly the one on the driver's side which is relatively close to the driver's head during normal driving. This pillar is directly in the line of vision of the driver when he turns his head counterclockwise to look toward the rear left quarter of the vehicle. Though perhaps by concerted effort the driver could view around this pillar, safety allows no more than a rapid glance which is ofttimes proven to be quite insufficient.

The result of such construction is that blind spot areas exist adjacent the rear quarters and renders potentially dangerous any steering of the vehicle from one lane to another during passing or in making turns. Such danger is particularly present on plural lane highways where other vehicles in adjacent lanes are frequently within these blind spot areas. In such situations, serious accidents often occur when these other vehicles go unnoticed by the first vehicle operator who actually steers into their path.

Moreover, it often happens that the side and rear windows of a vehicle become coated with fog, ice, snow or dirt during driving, which seriously reduces or even completely blocks visibility to the sides and/or rear of the vehicle.

The above dangerous operating situations created either by the construction of the vehicle itself or by atmospheric conditions could be avoided if some viewing means were provided whereby the operator would not have to look through the vehicle windows either directly or indirectly through a rear view mirror to determine the presence of other vehicles.

Another highly dangerous situation occurs when a first vehicle approaches a second vehicle on the wrong side of the highway. This happens, for example, when the first vehicle is passing a third vehicle on a hill over which the second vehicle operator cannot see. Elevated forward viewing means would in this situation reduce the chances of collision.

Heretofore, various types of viewing devices have been developed for installation on automotive vehicles for improving the operator's view exteriorly thereof. One type in wide use is the exteriorly located side view mirror. The effectiveness of these mirrors is limited by such factors as their relatively narrow viewing angle, their dependence upon a clear vent window or windshield, and the extent to which it is practical to extend them outwardly from the sides of the vehicle. Other devices which may conveniently be termed "periscopes" have been proposed; however, these devices require considerable alteration of the vehicle body, and particularly the roof thereof for their installation. Such alteration is of course, expensive and permanently detracts from the original smooth lines of the vehicle. In addition, serious sealing problems are created when alterations such as an aperture is made in the vehicle roof. Moreover, such an aperture in the vehicle roof reduces its strength and fatigue life which are serious considerations in certain vehicles which actually use the roof as a load bearing structural part of the body. Further, these devices have usually been of complex and expensive construction and their positions on the vehicle, particularly laterally thereof, have not been conveniently adjustable to eliminate specific blind spots which an operator may deem necessary for his particular vehicle.

Therefore, an object of the present invention is to provide improved viewing means for use on vehicles for improving the operator's view of other vehicles.

Another object is to provide improved viewing means in accordance with the above object, which may be installed on vehicles without requiring any alteration or special construction thereof which might introduce leaking or structural failure of portions of the vehicle.

Another object is to provide improved viewing means in accordance with the above objects, which is so constructed as to give the increased visibility in both forward and rearward directions.

Another object is to provide improved viewing means which may quickly and easily be affixed to automotive vehicles in a wide range of positions relative to the position of the operator to provide maximum viewing comfort for the operator and to maximize the effectiveness of the viewing means in eliminating specific blind spots.

Another object is to provide a viewer according to the above objects which will obviate the need for the operator to turn his vision away from the front of the vehicle.

Another object is to provide a simple, rugged, and economically feasible viewer for use on automobiles, and which does not require special skills or tools for installing the same thereon.

Another object is to provide a viewer in accordance with the above objects, which may be installed on automotive vehicles exteriorly of the passenger compartment thereof so that improved rearward and/or forward viewing may be achieved without requiring unsafe obstructions such as mirrors and mirror supports located within the passenger compartment.

Another object is to provide a viewed in accordance with the above objects which obviates the viewing problems created by the accumulation of fog, ice, snow, or dirt on the vehicle windows.

A further object is to provide a viewer in accordance with the above objects, which is compact, modern in appearance and which adds a distinctive look to the vehicle.

A still further object is to provide a rear viewer for automobiles which is so constructed that when installed thereon exteriorly of the passenger compartment its operation will not be adversely affected by water spray or dirt thrown thereon and on the windshield by preceding vehicles.

Further objects, advantages and novel features of the invention will become evident from the following description, claims and drawings wherein:

FIGURE 1 is a side elevation of an automobile with one form of the viewer mounted thereon;

FIGURE 2 is a top view of the vehicle of FIGURE 1 with other vehicles shown in the blind spot positions at the rear quarters of the vehicle;

FIGURE 3 is a perspective view of the mounted viewer;

FIGURE 4 is a front view of the mounted viewer;

FIGURE 5 is a sectional view of the viewer and an upper forward portion of the vehicle roof taken along the line 5—5 of FIGURE 4 in the direction of the arrows;

FIGURE 6 is a sectional view taken along the line 6—6 of FIGURE 5 in the direction of the arrows;

FIGURE 7 is a cross-sectional view of the viewer taken along the line 7—7 of FIGURE 4 in the direction of the arrows;

FIGURE 8 is a sectional view of a modified form of the viewer taken along a line corresponding to 8—8 of FIGURE 7 in the direction of the arrows;

FIGURE 9 is a cross-sectional view of a modified form of the viewer taken along a line corresponding to 7—7 of FIGURE 4 in the direction of the arrows;

FIGURE 10 is a side view of a rearward viewing internally reflective system with only portions of the housing showing;

FIGURE 11 is a side view of a forwardly viewing internally reflective system with only portions of the housing showing;

FIGURE 12 is a horizontal sectional view of the left side portion of a modern wraparound windshield showing the viewer in position thereon for side viewing in both the forward and rearward directions;

FIGURE 13 is a cross-sectional view of a modified form of the viewer housing structure and vehicle windshield;

Figure 14:
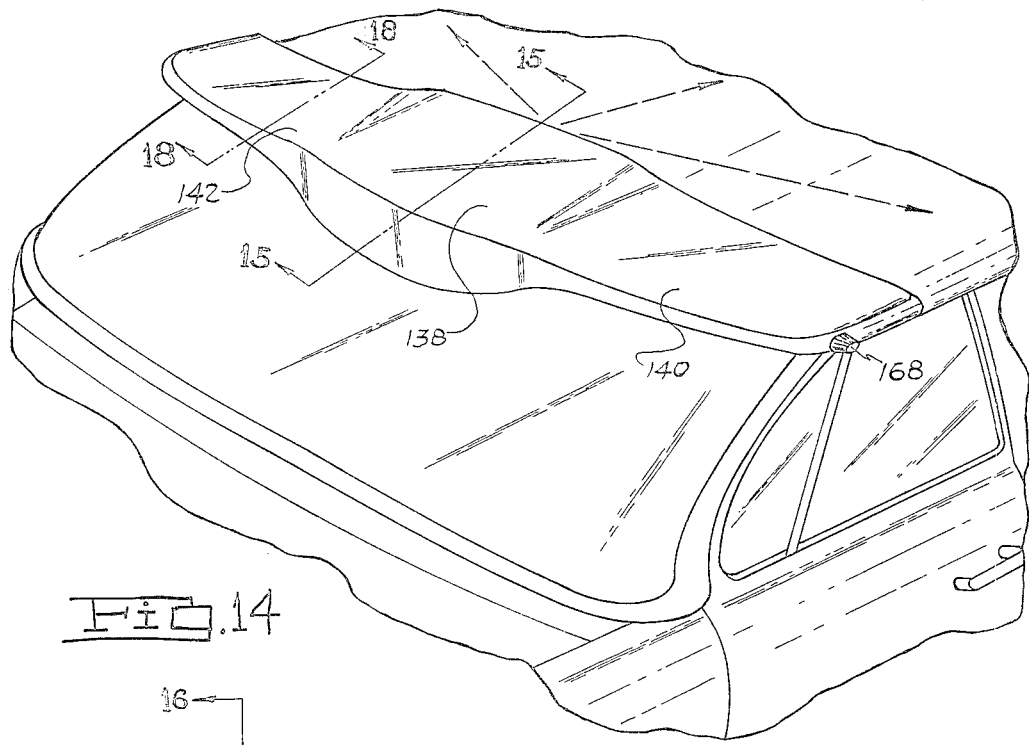
FIGURE 14 is a view toward the top-front of a vehicle provided with a combination rear viewer and sunvisor.
Figure 15:
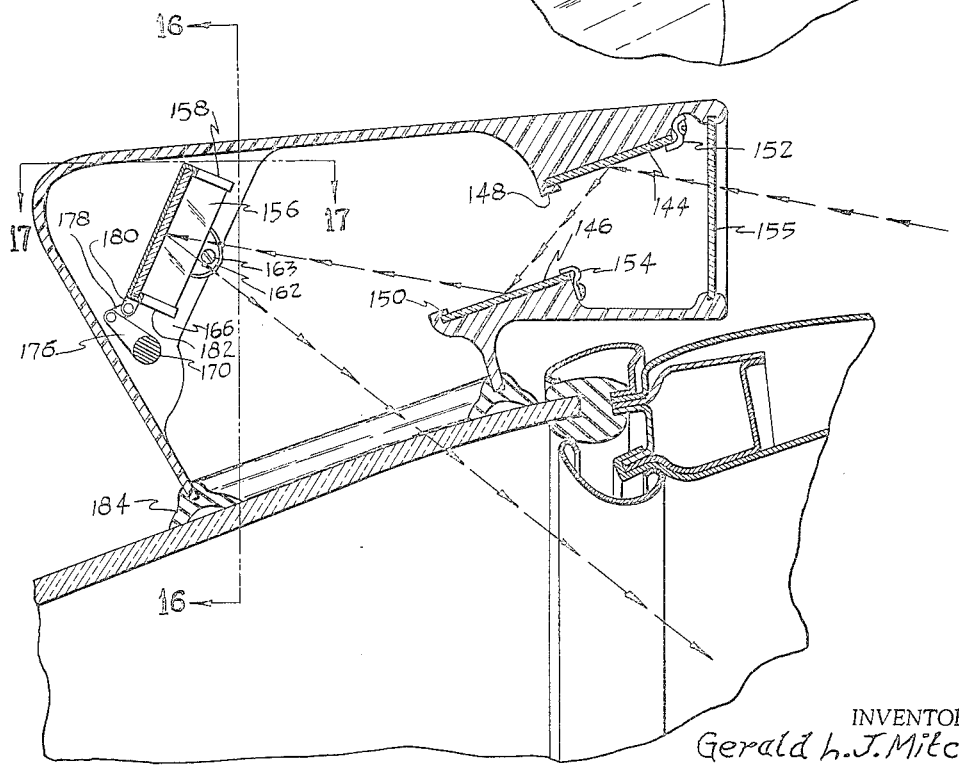
FIGURE 15 is a sectional view taken along line 15—15 of FIGURE 14 in the direction of the arrows.
Figure 16:
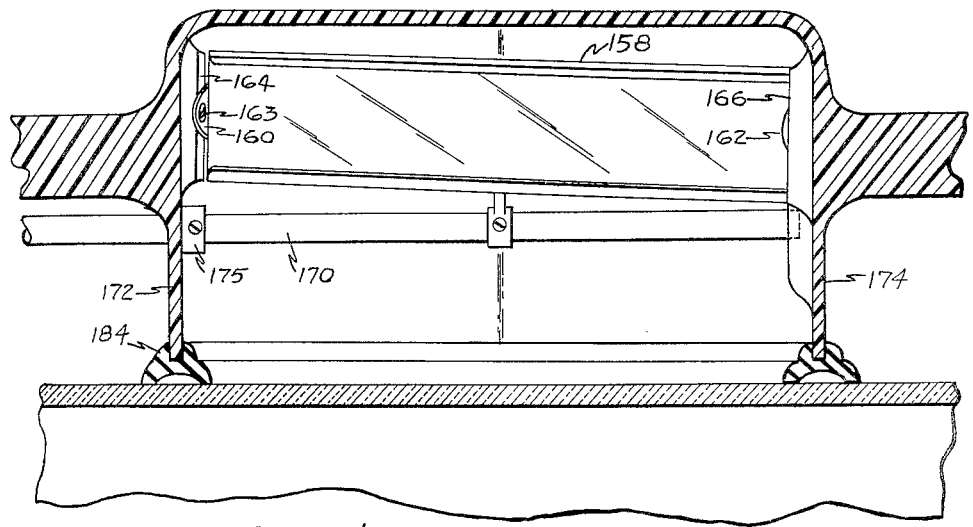
FIGURE 16 is a sectional view taken along line 16—16 of FIGURE 15 in the direction of the arrows.
Figure 17:
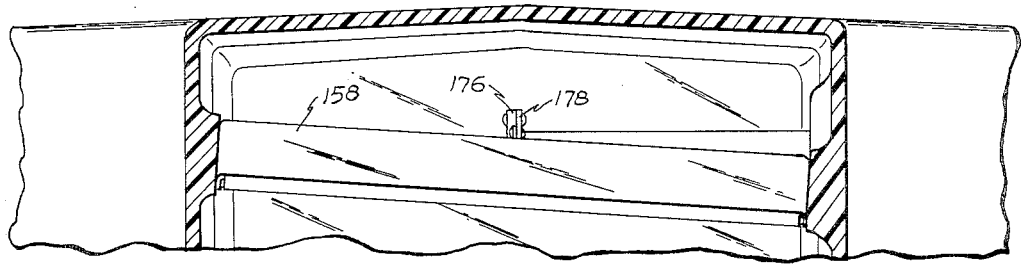
FIGURE 17 is a sectional view taken along line 17—17 of FIGURE 15 in the direction of the arrows.

Referring to the drawings and particularly to FIGURES 1 and 2, a modern automotive vehicle 10 is provided with a slanting curved windshield 12 set into the body 14 and roof 16 by a rubber retainer member 18 which also seals around the edges of the windshield. The body shown is of the sedan type having left and right rear quarter panels 20 and 22 respectively, providing roof supports 24 and 26 extending upwardly and rigidly supporting the rearward portion of roof 16 on opposite sides thereof. The central portion of the roof is supported on opposite sides by supports 28 and 30. Depending on the make of automobile, supports 28 and 30 may support either or both of the front and rear doors or the latching mechanisms therefor.

A rear window 32 set into the vehicle body allows the operator to see therethrough to the rear of the vehicle either by viewing indirectly through a rear mirror mounted on the top of the dashboard or suspended from inside of the roof, or by viewing directly by turning his head around. As shown in FIGURE 2, the use of a conventional rear view mirror indicated in outline as 33, is not entirely satisfactory since the rear supports 24 and 26 generally limit the viewing angle indicated by dotted lines A and B through which the operator can see to the rear of the vehicle. It is seen that this angle does not take in either of the vehicles 34 or 36 even under the best conditions of a clear rear window. On the other hand, where the rear window is fogged or otherwise covered, or even heavily rained upon, the vision therethrough within this angle can range from limited to zero. The angle defined by dotted lines A and B is not intended to represent the exact viewing limitations of all rear view mirrors in all adjusted positions in all automotive vehicles, but, is intended to reasonably show how and where viewing limitations of this type can easily lead the driver into the conclusion that vehicles are not in the positions illustrated by vehicles 34 and 36. In this regard, it is noted that many vehicles have relatively large rear windows which do in fact increase the rearward viewing angle of of the rear view mirror. However, blind spot areas to the rear sides of these vehicles still exist due to the combination of the limited viewing angle of the rear view mirror and the vehicle operator's limited side vision without head rotation illustrated by the lines X and Y in FIGURE 2. It is seen that in between each of the line pairs A–X and B–Y the blind spot areas remain. This is particularly true when vehicles 34 and 36 are relatively short such as the compact automobiles. It is further seen that with the operator's head 38 in the position shown in FIGURE 2 relative to support 28, turning of the head in a counterclockwise direction in an attempt to see car 36 would place the operator's line of vision directly in line with this support and block his vision. Moreover, should the rear and side windows, and particularly the rear side windows 38, become fogged or iced or otherwise covered, the operator would not be able to observe either of vehicles 34 or 36 whether he used the rear view mirror or turned his head in an attempt to directly view. In this respect, it is noted that even momentary diversion of the operator's attention to the rear or sides of the vehicle may place him in a dangerous position, particularly at high speeds.

According to the present invention, the viewer 40 in its preferred form allows viewing within the angle approximately defined by the projected lines C and D in FIGURE 2 so that either or both vehicles 34 and 36 may readily be observed by the operator without significant diversion of his attention from the road ahead. Moreover, as shown in FIGURE 1, the viewer readily allows twenty-five percent or more elevation in forward viewing height than by merely sighting through the windshield, which thereby allows the operator to see further over a hill and observe oncoming vehicles. These viewing improvements are not only desirable but are necessary from a safety standpoint since, to a great extent, they take the guesswork and unseen dangers out of driving.

Referring further to the drawings, the viewer 40 comprises a housing generally designated 42 having suitable light transmitting means therein, and a mounting mechanism generally designated 44 for securing the viewer to a vehicle. Housing 42 consists of a forward viewing section 46 and a rearward viewing section 48, each of sufficient size to give the vision scope desired. The bottom of the housing forms a continuous ridge portion 49 frictionally or adhesively secured in a rubber cushioning and sealing member 50, the ends of which are spaced in the front to receive therebetween a piece of felt or other moisture absorbing material 51 for a purpose hereinafter described. Member 50 is sufficiently flexible to take up normal imperfections or variations in the curvature of the windshield and provide a good seal. It is noted that ridge portion 49 may be contoured to more closely approximate the windshield curvature.

The oppositely disposed inner surfaces 52 and 53 of section 46 are provided with a pair of reflecting surfaces 54 and 56 respectively. These reflecting surfaces may be in the form of mirrors adhesively or otherwise secured to these inner surfaces or may be formed thereon by suitable coating techniques such as vacuum deposition of a highly reflective metal. A window 58 is provided in the front 60 of section 46 to transmit light to surface 56 which reflects it to surface 54 which in turn reflects it to the automobile operator. The path of the light is generally indicated by the arrows in FIGURE 5. In order to increase the forward viewing angle defined by the projected lines E and F in FIGURE 2, either or both of the reflecting surfaces 54 and 56 may be given a convex configuration as shown, for example, in FIGURE 6. In the manufacture of the viewer for a particular type of vehicle, the radius of curvature of surfaces 54 and 56 as well as their positioning and attitude relative to each other may readily be established for giving the required viewing performance.

Section 48 as shown in FIGURE 7 is provided with a reflecting surface 62 in the manner in which surfaces 54 and 56 are provided and may be curved like surface 54 shown in FIGURE 6. The rear portion of section 48 is provided with a lens 66 for transmitting light coming from the rearward direction to the reflector surface 62 and hence to the vehicle operator. Lens 66 is in the form of a prism so that the light impinging thereon from the aforesaid blind spot areas to the rear and sides of the vehicle will be bent downwardly sufficiently to strike surface 62 at a sufficient angle to be reflected to the eye of the vehicle operator. Here again the bending of light by prisms is well known and in the manufacture of the viewer the exact configuration and arrangement of the prism 66 and surface 62 may readily be determined to give the desired view to the rear and sides of the vehicle. Also, either the prism 66 or surface 62 may be curved as desired to give the best viewing angle.

An alternative rear viewing construction is shown in FIGURE 9 wherein the prism 66 of FIGURE 7 is replaced by a window member 68 and a reflective surface 70 which reflects the light transmitted from the aforesaid blind spot areas to surface 62 and hence to the eye of the vehicle operator. Again, the member 68 and either or both of the surfaces 62 and 70 may be curved as necessary for giving the desired rearward viewing angle.

Other alternative light redirecting means for use in the above or similar type viewer are shown in FIGURES 10 and 11. The rear view section comprises an internally reflective member 71 of glass or suitable plastic such as Acrylic, secured in suitably housing means 72 fragmentarily shown and having a mounting mechanism such as 44 and suitable sealing means such as member 50, as shown in FIGURE 5. Housing means 72 may also be adhesively secured to the windshield in the manner hereinafter indicated for housing 42 as an alternative mounting means. In the operation of member 71 the light directed from the rear of the vehicle will impinge on the internal reflecting surface 73 and be reflected to another internal reflecting surface 74 which will in turn reflect it through the windshield to the vehicle operator. In FIGURE 11, the forward viewing section comprises a glass or plastic member 75. An internal reflecting surface 76 thereof receives light from a forward direction and reflects it to another internal reflecting surface 77 which will in turn reflect it through the windshield to the vehicle operator. The limitations and operation of such internal reflective systems are well known and the proper angles for the reflecting surfaces thereof may readily be determined for producing the best results for a particular viewer application.

It is particularly noted that many types of light redirecting systems including solely light refractive means are known, and more may be developed, which are readily adaptable for use with the present invention. In this regard, a large variety of shapes and sizes of prisms, lenses, windows and reflecting surfaces and combinations thereof are readily available for constructing a large variety of light redirecting systems usable in the present viewer. It is not applicant's intention, therefore, to limit the invention disclosed herein by way of the specific shapes and types of light redirecting means illustrated.

Housing 42 may conveniently be molded from an opaque plastic and the transparent window or lens member 58, 66, and 68 thereafter set into suitable openings in the housing and adhesively or frictionally secured therein by any suitable known means. Members 58, 66, and 68 may be made from suitable transparent plastic materials such as vinyl which are known to possess the proper light transmitting properties. An alternative construction would be to mold the entire housing including the window and lens members from clear plastic material and thereafter render opaque the portions thereof through which light is not to be transmitted. The actual configuration of the housing is dependent upon the exterior design desired and upon the slant of the windshield 12. For example, the slant of the windshield will determine the relative lengths of the forward and rear portions 60 and 64 respectively of the housing. In this regard, when the viewer is to be used on vehicles having substantially vertical windshields 78 as shown in FIGURE 13, the bottom edge 49 thereof and the rest of the housing may be constructed so that edge 49 is in a substantially vertical plane rather than in the slanting substantially horizontal plane shown in FIGURE 5. This could readily be done by extending portion 60 downwardly and then inwardly toward the windshield, and by also extending portion 64 inwardly toward the windshield. The ends of the housing would also be formed to coincide with portions 60 and 64 to provide the edge 49 in a single common substantially vertical plane coinciding with the windshield as shown in FIGURE 13.

The rubber member 50 is formed with a concave bottom surface so that when it is pressed down against the windshield by the mounting mechanism 44 in a manner hereinafter described, it will seal the chamber 79 formed by the housing and windshield against dust and moisture. However, in the event that water vapor tends to condense in chamber 79, the aforesaid material 51 will tend to absorb the condensate and expose it to the atmosphere for reevaporation therein.

The housing, lens and windows may be made as large as necessary to give the desired front and rear views. It is also within the scope of this invention to provide not only the combination of the front and rear view sections 46 and 48, but, also to manufacture either of these sections separately and with separate mounting mechanisms 44 for individual use of these sections. For example, it may be desired to mount section 46 adjacent the left end 80 of the windshield and section 48 adjacent the right end 81 thereof for providing a symmetrical appearance. Where it is desired to use the viewing sections in this manner, the reflecting surface 62 of section 48 could readily be angled as shown in FIGURE 8 to compensate for the laterally offset position of section 48 relative to the operator and thereby maintain a viewing angle equivalent to that defined by lines C and D of FIGURE 2. It is also within the scope of this invention to adjustably mount the windows, lens, and reflecting surfaces so that the vehicle operator may adjust them to suit his particular needs. Many forms of suitable adjusting mechanisms are known and it is within the purview of one skilled in the art to adapt these mechanisms to the present viewer. In the use of curved lenses, windows and reflecting surfaces, distortion of the images may occur. These distortions, however, if kept to a reasonable degree will not impair the function of the viewer and the operator will still be able to readily observe motion and other vehicles within the aforesaid blind spot areas.

The exterior front portion 60 of the viewer may be contoured as desired, for example, in the manner shown in FIGURES 3 through 5 with interconnected horizontal and vertical ribs 82 and 83 respectively, and with horizontal ridges 84 to provide a pleasing appearance to the viewer in accordance with the exterior design of the vehicle. The color of the viewer may also be varied by the manufacturer in accordance with that desired for a particular color automobile.

Referring to FIGURES 3, 4 and 5, the mounting mechanism 44 is adapted to attach the viewer to the forward portion of a vehicle roof. In FIGURE 5 is shown a longitudinal section of the forward portion of a typical automobile roof comprising a sheet metal outer portion 16, a metal upper windshield header 85, a metal lower windshield header 86 and a metal windshield frame 87 welded together as indicated to form a rigid forward roof portion and upper windshielding mounting structure. A fabric or plastic headliner 88 is secured to the forward edges of members 86 and 87 and forms the inner visible portion of the roof. A garnish molding 89 surrounds the periphery of the windshield on the inside of the vehicle and obscures the structural details of the adjacent portions of the vehicle interior. An exterior molding strip 90 surrounds the periphery of the windshield and performs on the exterior of the vehicle a function similar to molding 89. Strip 90 is formed with a leg 92 which is frictionally and sealingly inserted into a peripheral slot 94 in member 18 as are end portions of members 16, 85, and 87. Strip 90 is rigidly retained in the position shown and the forward portion 96 thereof is adapted to engage the adjacent and upper portion of member 18 to prevent pulling of the same away from the windshield edge portion 98 which is frictionally sealingly received in an inner peripheral groove 100 in member 18.

The mounting mechanism 44 comprises a sheet metal body portion 102 contoured as shown in FIGURE 3 to coincide with the contour of the front portion of the roof 16 and is formed with a pair of arms 104 and 106. These arms are apertured adjacent their outer ends to pivotally receive projections 108 and 110 formed integrally on the opposite ends of housing 42. A strong but flexible metal retainer 112 is adapted to threadedly receive a screw 114 which is rotatably insertable through a suitable aperture in body portion 102. The retainer is formed with an inwardly extending leg 116 and a downwardly extending leg 118. A rubber cushion member 120 is adhesively secured to the underside of body portion 102 preferably in the center thereof to prevent the mounting mechanism from bearing directly on the roof 16 and scratching the same. The central location of member 120 allows mechanism 44 to tightly draw the rubber member 50 down against the windshield should the lateral curvatures of the windshield and roof 16 not coincide and tend to cantilever the mechanism 44.

In mounting the viewer on the windshield, retainer 112 is flexed sufficiently to allow leg 116 thereof to be forced into groove 100 in member 18, as shown, while leg 118 is moved inwardly over the molding strip 90 and allowed to snap in behind the rearward portion 122 of the strip. The viewer is then positioned on the windshield adjacent the upper edge thereof so that the screw-receiving aperture in body portion 102 is aligned with the threaded aperture in retainer 112. Screw 114 is then threaded into the retainer to tighten rubber member 50 against the windshield. It is noted that retainer 112 is sufficiently rigid to prevent the tightening force of screw 114 from urging leg 118 out of engagement with the rear portion 122 of molding strip 90. In other words, member 120 and the projections 108 and 110 on the housing provide a three-point force developing system for insuring that member 50 will form a good seal with the windshield even when the lateral planes of body portion 102 and the underlying roof 16 are non-parallel. If this problem doesn't exist, however, or if not serious, additional rubber cushion may be employed. The outer portion 96 of the molding strip 90 prevents excessive upward motion of the adjacent portion of member 18 as screw 114 is threaded and tightened into the retainer. A lock washer 124 intermediate the head of screw 114 and body portion 102 will thereafter prevent vibrations from loosening the screw 114 and the viewer mounting mechanism.

Retainer 112 can readily be mounted at any lateral position along the top of the windshield to position the viewer as may be required by the operator for his particular vehicle. While the leg 116 of the retainer prevents lifting of the viewer from the windshield, leg 118 prevents the viewer and mounting from moving down the windshield. The combined action of these legs, therefore, prevents even severe vibrations and forces from dislocating the viewer from its set position. It is seen that this particular type of mounting mechanism does not require any modification in any way of the conventional automobile construction and does not create any sealing or body structure fatigue problems.

The specific shapes of the forward portion of the roof, as shown in the cross-sectional view of FIGURE 5, will of course vary somewhat between different types and makes of vehicles; however, substantially all vehicles will provide equivalent structure against which the legs 116 and 118 may abut to prevent dislocation of the viewer. It is, therefore, within the scope of this invention to alter the configuration of the mounting mechanism and particularly retainer 112 from that specifically shown to adapt it to variations in roof construction. In this regard, where larger viewers are desired than that illustrated herein, a pair of retainers 112 may be employed, one adjacent each end of the body portion 102 for additional rigidity.

In the event that a strictly mechanical form of mounting of the viewer is impractical, the rubber member 50 may be adhesively secured to the exterior of the windshield in a proper location for the desired viewing. The viewer is actually of relatively lightweight and would not tend to fracture the adhesive joint. Many types of rapid air drying or activated room temperature curing rubber type cements are available for this purpose. These cements are also provided with plasticizing components for maintaining the cement sufficiently flexible at low temperatures to prevent embrittlement thereof and fatiguing of the joint. Such an adhesive joint might be practical, for example, on buses, trucks, or other vehicles having substantially vertically disposed windshields as shown in FIGURE 13.

In the operation of the rearwardly viewing portion 48 of the viewer, it is seen, with reference to FIGURE 1, that the viewer is made of sufficient height to receive images below the roof line of the vehicle as indicated by the sight line G which when projected from the light-receiving prism 66 of FIGURE 6 or the reflecting surface 70 of the alternate construction shown in FIGURE 7 extends downwardly and rearwardly so that viewer can pick up and transmit images below the roof line and to the sides of the vehicle. This downwardly projecting sight line G becomes more pronounced in its downward direction as viewing is made further toward the sides of the vehicles. This is accounted for mainly by the arcuate lateral configuration of the roof. It is seen, therefore, that vehicles in the positions indicated 34 and 36 in FIGURE 2 will readily be observed through the viewer. Where the viewer is used on vehicles such as compact automobiles having lower roof lines, the ability of the viewer to obviate blind spots is significantly increased. In any event, the viewer may be made as high as necessary to insure that vehicles in the positions 34 and 36 will be observed. As aforesaid, the rear viewing section 48 may be mounted further to the side of the vehicle, or two of these sections may be used on opposite sides of the windshield to insure that no portion of the blind spot areas toward the rear quarters of the vehicle are missed.

It is particularly pointed out that in the use of the viewer, adverse weather and driving conditions which may tend to coat the windshield and obscure vision therethrough will have no such effect upon the portion of the windshield lying interiorly of the rubber sealing member 50, and rear view vision through the viewer will not be impaired. Moreover, the forward motion of the vehicle and the resulting air flow will also tend to maintain the prism 66 or window 68 in a clear condition. Moreover, the top and side portions of the housing may be projected a substantial distance beyond the rear 64 thereof as indicated by the dotted lines 126 in FIGURE 3 to further prevent the settling of dust or moisture or the like on the rear lens, prism or window of the viewer. With such extension of the housing, the body portion 102 of the mounting 44 is modified accordingly.

The versatility in the configuration and placement of any of the forms of the viewer illustrated herein, made possible by the transmission of the image through the windshield is further exemplified by the side viewer 128 of FIGURE 12. This side viewer may be mounted at either or both sides of the windshield and is especially suitable for seeing around the sides of trucks and the like ahead or behind of the vehicle and substantially completely obviates blind spot areas to the sides of the vehicle. This side viewer and its mounting means may take any of the forms illustrated herein and is shown with a single rearward viewing reflective surface 130 and a single forward viewing reflective surface 132 indicated by the dotted lines and positioned above or below reflector 130 within the common housing 134. A window 136 in the rear of the housing passes light to reflector 130, and a similar window (not shown) in the front of the housing passes light to reflector 132.

Referring to FIGURES 14–18, the viewer portion 138 is attached to or formed with sunvisor portions 140 and 142, preferably of metal or plastic. Where the combination is formed from plastic, the sunvisor portions and viewer portion may be integrally molded. Internally of the viewer portion 138, mirrors 144 and 146 are secured by shoulders 148 and 150, and clamps 152 and 154 respectively to projecting portions of the viewer housing. A window 155 seals the viewer cavity from dust and moisture. It is noted that the top of portion 138 may be so constructed that it may be removed for easy replacement or assembly of the mirrors.

An adjustable mirror 156 is clamped in a frame 158 which has lugs 160 and 162 formed up on opposite ends and pivotally secured in bearing portions 164 and 166 on the opposite sides of the bearing housing. The pivotal axis of this mirror tilts slightly downwardly and rearwardly in the manner shown respectively by FIGURES 16 and 17 for the purpose of directing light coming substantially directly from the rear of the vehicle to the operator's eye. To see toward the rear corners of the vehicle, the operator need only to move his head slightly to the right or left. This mirror is manually adjustable from outside to compensate for differences in operators' eye levels, by turning knob 168 on the end of shaft 170 rotatably mounted in the walls 172 and 174 of the viewer housing. An arm 176 is secured to shaft 170 for rotation therewith, and is pivotally connected to arm 178 which in turn is pivotally connected to lug 180 formed down from the lower edge 182 of frame 158.

Figure 18:
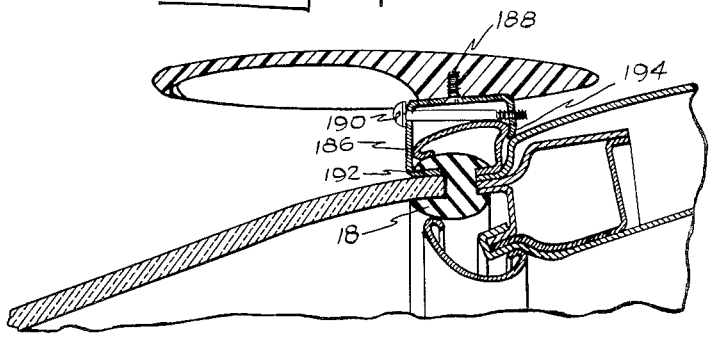
FIGURE 18 is a sectional view taken along line 18—18 of FIGURE 14 in the direction of the arrows.

The sealing member 184 of the viewer portion is secured tightly against the windshield by clamps 186 which are secured by screws 188 to the sunvisor portions. A screw 190 secures each clamp 186 to the windshield retainer 18 and overlying molding by urging legs 192 and 194 of the clamp thereagainst as shown in FIG. 18. Any number of such clamps may be used.

This combination of rear viewer and sunvisor uniquely allows the operator to obtain an excellent view through the viewer even though brilliant sunlight bears upon the windshield. Without the sunvisor, the viewer loses a substantial portion of its effectiveness.

It is noted that although an inverted image may be produced by some of the reflector arrangements falling within the scope of the present invention, the principle is nevertheless achieved, that is, to inform the operator of the vehicle that some object is within the dangerous area or blind spot which the present device is intended to uncover. Therefore, it is seen that the operator is not expected to dwell upon the image to determine any of its details, but rather, merely to perceive the presence of the object and to act thereafter with proper discretion.

While it will be apparent that the embodiments of the invention herein disclosed are well calculated to fulfill the objects of the invention, it will be appreciated that the invention is susceptible to modification, variation and change without departing from the proper scope or fair meaning of the subjoined claims.

I claim:

1. A viewer for a vehicle having a windshield retained therein, said viewer comprising housing means, light directing means in said housing means, mounting means on said housing means for attaching the same to the exterior of a vehicle so that directed light will be transmitted through the windshield of the vehicle to the operator thereof, said mounting means comprising a lever having arm portions pivotally attached to said housing means and having fulcrum means for bearing on the forward portion of the vehicle roof, retaining means having leg means adapted to be inserted between the windshield and its retainer, and means for connecting said retaining means to a portion of said lever intermediate the pivot points of said arm portions and said fulcrum and for urging said housing means tightly against the windshield.

2. In a vehicle having a windshield secured in a forward portion of the body thereof, and having shoulder means adjacent the forward portion of the vehicle roof, a viewer comprising a housing containing light-directing means, mounting means adjustably securing said housing to said shoulder means in such a position that said directing means can receive light directed from sources rearwardly of said windshield and direct it through said windshield to the operator, said mounting means comprising a lever having arm portions attached to said housing means and further having fulcrum means for engaging a forward portion of the vehicle roof, retaining means having leg means adapted to engage said shoulder means for inhibiting upward motion of said retaining means relative to said vehicle roof, and means for connecting said retaining means to a portion of said lever intermediate said arm portions and said fulcrum means and operable to draw said lever means toward said retaining means to thereby urge said housing means tightly against said windshield.

3. In a vehicle having a windshield secured in a forward portion of the body thereof, and having shoulder means adjacent the forward portion of the vehicle roof, a viewer comprising a housing containing light-directing means, mounting means adjustably securing said housing to said shoulder means in such a position that said directing means can receive light directed from sources forwardly of said windshield and direct it through said windshield to the operator, said mounting means comprising a lever having arm portions attached to said housing means and further having fulcrum means for engaging a forward portion of the vehicle roof, retaining means having leg means adapted to engage said shoulder means for inhibiting upward motion of said retaining means relative to said vehicle roof, and means for connecting said retaining means to a portion of said lever intermediate said arm portions and said fulcrum means and operable to draw said lever means toward said retaining means to thereby urge said housing means tightly against said windshield.

4. In a vehicle having a windshield secured in a forward portion of the body thereof, and having shoulder means adjacent the forward portion of the vehicle roof, a viewer comprising a housing containing light-directing means, mounting means adjustably securing said housing to said shoulder means in such a position that said directing means can receive light directed from soures forwardly and rearwardly of said windshield and direct it through said windshield to the operator, said mounting means comprising a lever having arm portions attached to said housing means and further having fulcrum means for engaging a forward portion of the vehicle roof, retaining means having leg means adapted to engage said shoulder means for inhibiting upward motion of said retaining means relative to said vehicle roof, and means for connecting said retaining means to a portion of said lever intermediate said arm portions and said fulcrum means and operable to draw said lever means toward said retaining means to thereby urge said housing means tightly against said windshield.

References Cited by the Examiner

UNITED STATES PATENTS

| | | | |
|---|---|---|---|
| 1,666,236 | 4/1928 | Fuerth | 88—70 |
| 1,719,342 | 7/1929 | Rodgers | 88—86 |
| 2,264,014 | 10/1941 | Wohlfield | 296—95 |
| 2,374,956 | 5/1945 | Rubissow | 88—86 |
| 2,507,397 | 5/1950 | Bracken | 296—95 |
| 2,512,792 | 6/1950 | Delaney | 88—86 |
| 2,566,934 | 9/1951 | Dieterich | 296—95 |
| 2,953,062 | 9/1960 | Ford | 88—86 |
| 3,001,450 | 9/1961 | Hyde | 88—86 |
| 3,033,083 | 5/1962 | Kerfoot | 88—70 |
| 3,064,536 | 10/1962 | Weingartner | 88—98 |

JEWELL H. PEDERSEN, *Primary Examiner.*

JOHN K. CORBIN, *Examiner.*

R. STERN, *Assistant Examiner.*